United States Patent [19]

Jacobsen et al.

[11] Patent Number: 5,761,152
[45] Date of Patent: Jun. 2, 1998

[54] METHOD AND SYSTEM FOR INCREASING FOLD TO STREAMER LENGTH RATIO

[75] Inventors: Nils-Erik Jacobsen, Houston, Tex.;
Svein Torleif Vaage, Kolsas, Norway;
Rolf Ronningen, Houston, Tex.

[73] Assignee: PGS Exploration (US), Inc., Houston, Tex.

[21] Appl. No.: 739,408

[22] Filed: Oct. 29, 1996

[51] Int. Cl.⁶ .................................. G01V 1/38; G01V 1/36
[52] U.S. Cl. .................................. 367/15; 367/20; 367/56; 181/110
[58] Field of Search ..................... 181/110; 367/15, 367/56, 20

[56] References Cited

U.S. PATENT DOCUMENTS

| | | | |
|---|---|---|---|
| 4,914,636 | 4/1990 | Garotta | 367/56 |
| 4,970,696 | 11/1990 | Crews et al. | 367/15 |
| 5,424,999 | 6/1995 | Manin | 367/21 |

*Primary Examiner*—Ian J. Lobo
*Attorney, Agent, or Firm*—Gordon T. Arnold

[57] ABSTRACT

A method and system are provided for use in marine seismic data surveys to increase fold and offset without increasing streamer length or drag on the streamer boat. Generally the method comprises the use of a second source boat positioned in the steamer path and firing the second source at a time before the recording of information from the first source is finished. By positioning the second source about one streamer length in front of the closest hydrophone, the fold is increased by two for the same length streamer.

21 Claims, 6 Drawing Sheets

METHOD AND SYSTEM FOR INCREASING FOLD TO STREAMER LENGTH RATIO

BACKGROUND OF THE INVENTION

This invention related to the field of marine seismic data acquisition and more particularly to the field of Common Mid-Point (a.k.a. "CMP") marine data acquisition.

In the field of marine seismic data acquisition, seismic signal sources (e.g. air guns) are towed behind a vessel, which also tows a set of streamers. The streamers include signal receivers (e.g. hydrophones) which are sensitive to reflections, refractions, and other "information" from sound impulses emitted by the sources. In many modem arrays, multiple streamers and multiple sources are used, requiring very large pulling forces to deal with the drag associated with the towed arrays.

It has long been known that for high quality data, multiple traces of information from the same layer are required to be added. Since the noise associated in each piece of information is random, the addition of multiple signals from the same sub-surface reflection point results in an increase in the information signal with a cancellation of the noise. This process is commonly known as the Common Mid-Point method.

As is known in the art, the number of reflections from the same reflector is commonly referred to as the "fold" of the survey. Increase in fold results in an increase in signal-to-noise ratio, and, therefore, increase in fold is desirable. Traditionally, to increase fold, the number of hydrophones in the streamer is increased, making the streamer longer. It is also desirable to tow multiple streamers behind the seismic vessel with the distance between the steamers as small as possible, to increase resolution of the survey. Unfortunately, as streamer numbers increase, so do the operational constraints, resulting in an upper limit to the length of the streamer. Also, as the distance between the steamers decreases, the natural feathering or snaking movement of the streamer in the water increases the chances of the tangles in the ends of the streamers, especially during turns. Thus, the length of the streamer is again limited.

It has also been found that it is desirable to increase the long offset (i.e., the distance between the source and the furthest receiver) in many surveys. Such an increase gives benefits that are well known in the art, (e.g. increase fold, better define deep sub-salt data, and generally improve signal-to-noise ratios). However, to increase the offset, the streamer must be lengthened. Increased streamer length increases the drag and limits the number of streamers that can be towed, which results in an increase in streamer separation.

Further still, the signal strength of information received at long offsets is significantly lower than that at the near offset. As the streamer length increases, the signal strength decreases, resulting in the need for a larger source. However, large sources increase drag and deck handling problems, again limiting the size and/or density of the towable array.

Accordingly, there is a need for a method and system to increase the fold in a marine survey, as well as the offset, without (1) increasing streamer length, (2) decreasing the number of streamers, or (3) increasing the distance between the streamers.

It is the object of the present invention to address the above-described needs.

SUMMARY OF THE INVENTION

According to the present invention, the above-described needs are addressed by a "seismic vessel" ("SEV"), which tows streamers and sources, used with a source vessel ("SOV"). According to one embodiment, assuming that the length of the streamers of the SEV is L and that the separation between the source (on the SEV) and the head of the middle streamer is X, the source of SOV is positioned either L in front of the source position of the SEV or L+X behind the last active streamer section of the SEV. The combined source-receiver offset coverage will be from X to X+2L.

Further, the seismic source of the SOV will be fired with a delay relative to the source fire time of the SEV. The firing delay is optimized so that the seismic information generated by the source of the SEV is not influenced by the seismic information generated by the source of the SOV. Both shots are recorded into the same record. The total record length is kept as short as possible, but long enough so that the required seismic information generated by the source of the SOV is included By this, the cycle time between shots is minimized so that the maximum fold coverage is maintained.

For some deep water embodiments, the seismic recording is delayed relative to the source fire time on the SEV, to reduce total cycle time and record sub-surface data for a longer period. The cycle time and fold is tuned for various water depths.

In some embodiments, the invention is used with single sources on the SEV, while in others, multiple sources are used. In still further embodiments, the SOV deploys the same number of sources as the SEV, and in other embodiments, differing numbers of sources between the SEV and the SOV are used.

In still further embodiments, the source on the SOV has a different amplitude (for example, in an air gun array, either volume, pressure, or both) than the source of the SEV. For alternative embodiments, the SOV source has the same amplitude as the SEV.

Still further, additional streamer vessels, deployed beside the SEV, are used in other embodiments.

In even further embodiments, more than one SOV is used. For example, the position of SOV number J, in one embodiment, is either JL in front of the source position of the SEV or JL+X behind the last active streamer section on the SEV. The combined source-receiver offset coverage will be from X to X+(J+L). The different sources are fired sequentially and recorded into the same record as described above.

In summary, through use of the present invention, seismic offset is increased without increasing streamer length, thus reducing the in-water equipment, and, at the same time, high fold coverage is maintained and enhanced.

DESCRIPTION OF THE DRAWINGS

For a more complete understanding of the present invention and for further advantages thereof, reference is made to the following Detailed Description taken in conjunction with the accompanying drawings, in which.

It is to be noted, however, that the appended drawings illustrate only typical embodiments of this invention and are therefore not to be considered limiting of its scope, for the invention may admit to other equally effective embodiments.

DETAILED DESCRIPTION

Figure 3:
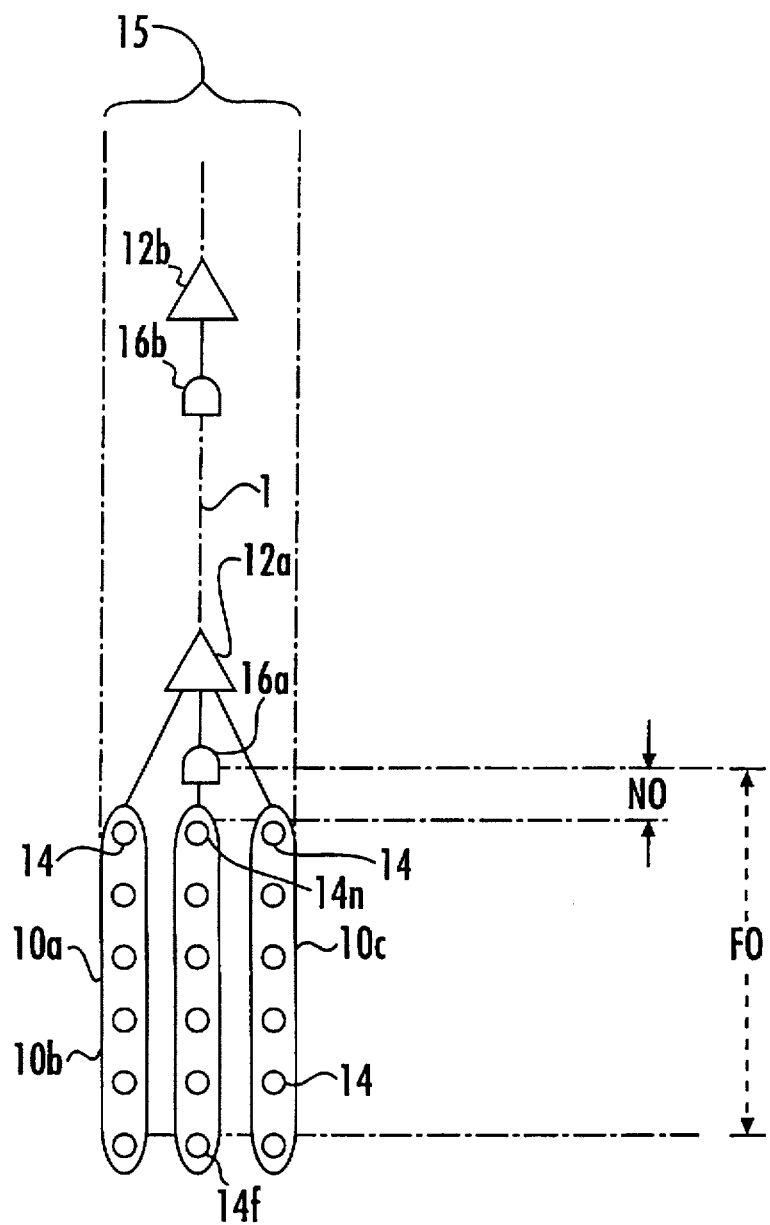
FIG. 3 is a top view of an embodiment of the invention.

Referring now to FIG. 3, an example embodiment of the invention is shown of a system for seismic data along a survey line 1 comprising: a first vessel 12a towing hydrophone streamers 10 having hydrophones 14 housed therein, including a near hydrophone 14n and a far hydrophone 14f. Vessel 12a also tows a first seismic source 16a. The distance between the first seismic source 16a and the near hydrophone 14n defines the near offset N.O., and the distance between the first seismic source 16a and the far hydrophone 14f defines the far offset F.O.

A second vessel 12b is also shown, towing a second seismic source 16b ahead of the first vessel 12a. The distance between the second source 16b and the near hydrophone 14n is about the first vessel far offset F.O. or less.

Although the invention described herein is useful in a single streamer system, in preferred embodiments, the system comprises multiple streamers 10 (here three are shown, although the number is not limited by the present invention) being towed by the first vessel 12a. Also, multiple sources 16a are towed by the first vessel 12a and multiple sources 16b are towed behind second vessel 12b, according to still a further embodiment.

Figure 4:
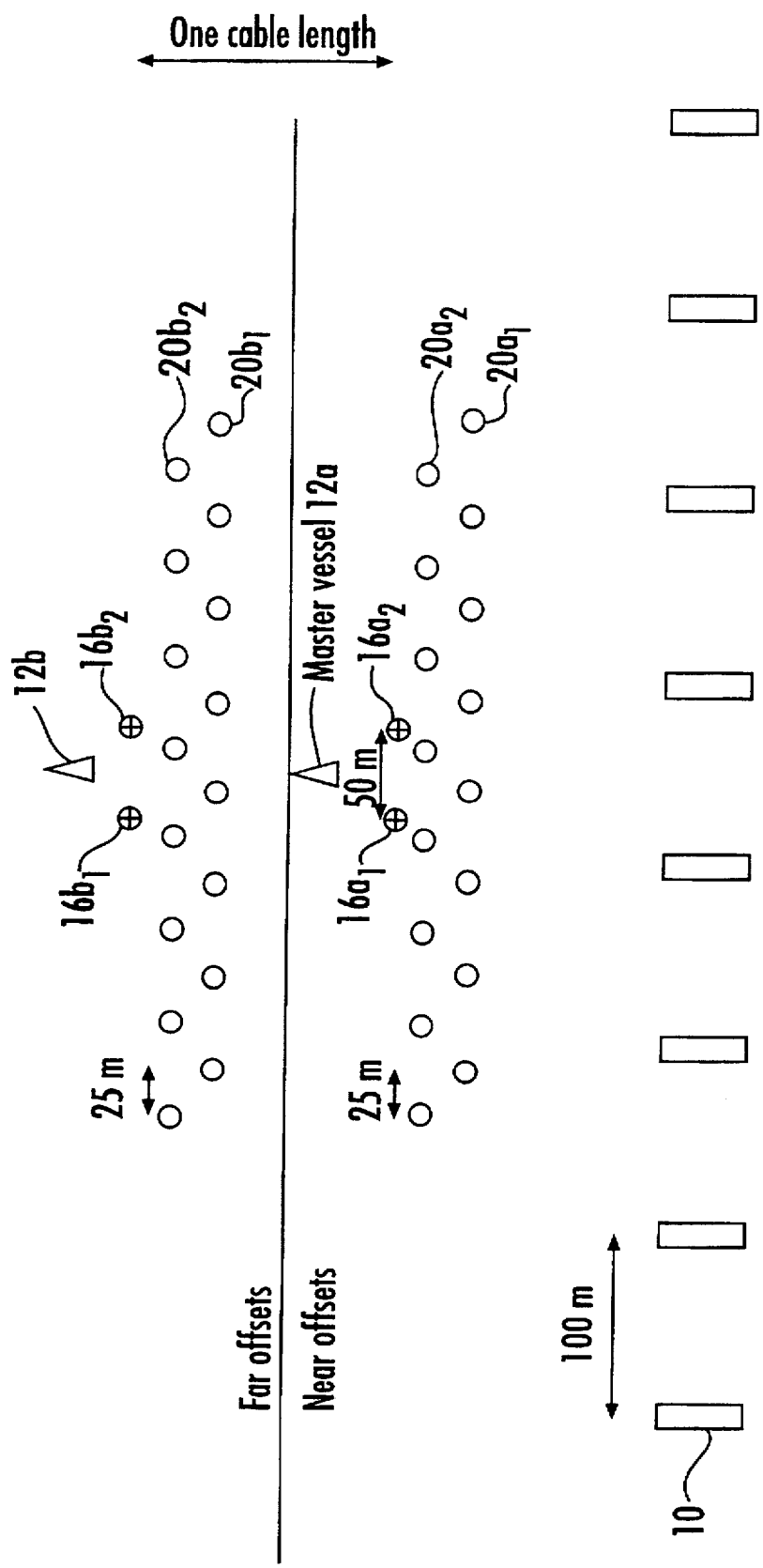
FIG. 4 is a top view of an alternative embodiment of the invention.

Referring now to FIG. 4, a specific embodiment is shown with multiple source elements 16a1 and 16a2 making up the source behind vessel 12a and source elements 16b1 and 16b2 making up the source behind vessel 12b. According to this embodiment, the source elements 16a1 and 16a2 are e.g. spaced laterally about 50 meters, as are source elements 16b1 and 16b2. The steamers 10 are e.g. spaced about 100 meters from each other.

As the vessels 12a and 12b move along the survey line, source 16a1 fires, and CMP hits 20a1 (representing information from reflectors beneath the surface, as explained more fully below) are recorded. Before the recording of CMP hits 20a1 from the deepest depth of interest ends (which may take several seconds) source element 16b1 fires, timed such that the earliest information of interest from the firing of source element 16b1 (seen in FIG. 4 as CMP hits 20b1) are recorded in streamers 10 just after the last information of interest is recorded from the firing of source element 16a1. Then, after recording of the deepest information of interest from the firing of source element 16b2, source element 16a2 fires, CMP hits 20a2 are recorded, and before the CMP hits from the deepest information of interest are recorded, source element 16b2 fires. CMP hits 20b2 are recorded from the firing of source element 16b2, preferably into the same record as the hits 20a2. Through careful timing of the firing of the various source elements, the following is achieved: long offset, high fold marine data, and dense streamer spacing. A practical configuration would be to use twelve streamers with length of about 4 km, a streamer separation of 100 meters, a distance between source elements 16a (2 elements, with a spacing of about 50 meters) and vessel 12a of between about 200 and 350 meters, and a distance between the source elements 16a and the first hydrophone in streamers 10 of between about 200 and 350 meters. Second vessel 12b is seen towing source elements 16b (2 elements, with a spacing of about 50 meters), the distance between the source elements 16a and 16b is about the length of the streamers (about 4 km).

According to another aspect of the invention, referring again to FIG. 3 a method for recording marine seismic data in a data survey is provided, comprising:

towing a plurality of streamers 10 behind a first vessel 12a, wherein the streamers comprise a set of seismic signal receivers 14 positioned along the streamers 10 for receiving seismic signals and transmitting the signals to the first vessel 12a, and wherein the outermost streamers 10a and 10c define a streamer path 15 substantially parallel to the survey line 1;

towing a first seismic signal source 16a behind the first vessel 12a, wherein the receiver closest to the source 16a defines a near offset receiver 14n and the distance between the near offset receiver 14n and the source 16a defines the near offset N.O., and wherein the receiver furthest from the source defines a far offset receiver 14f and the distance between the far offset receiver 14f and the source 16a defines the first vessel far offset F.O.; and towing a second seismic signal source 16b behind a second vessel 12b wherein the source 16b behind the second vessel 12b is towed along the streamer path 15, wherein the distance between the second source 16b and the near offset receiver 14n is optimally the length of the streamers 14.

Figure 1:
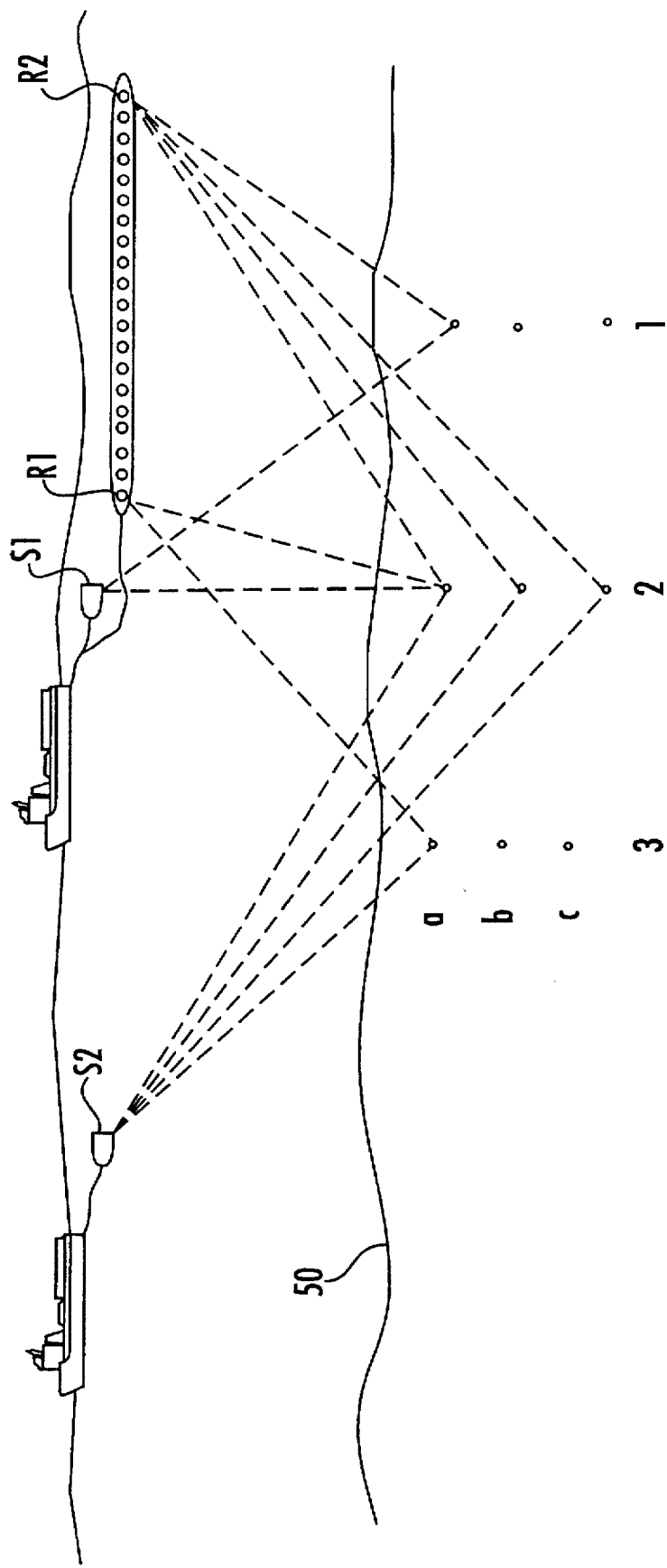
FIG. 1 is a side view showing receiver and source locations in relation to reflectors.
Figure 2:
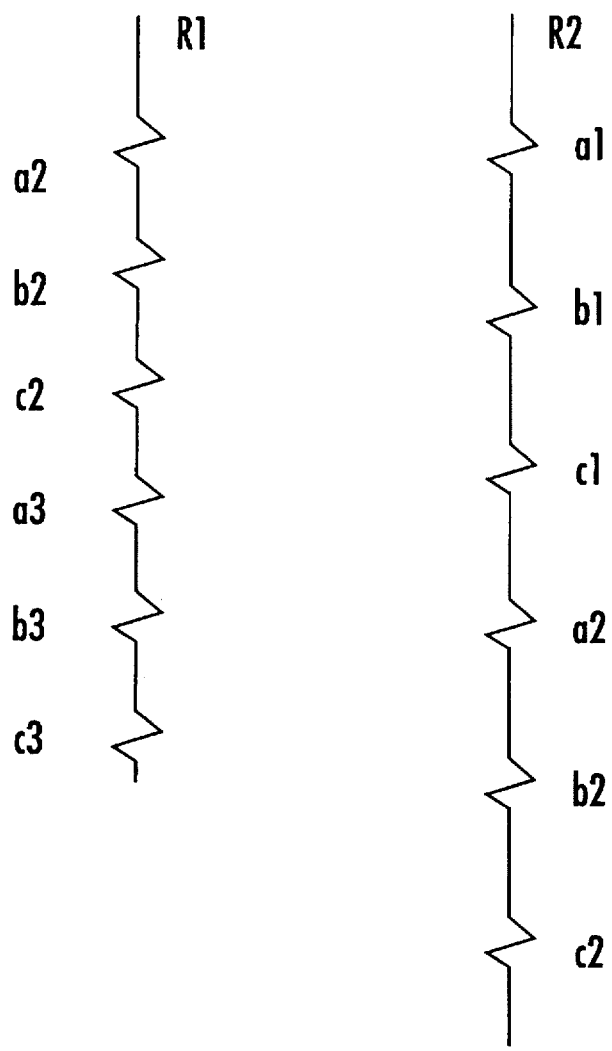
FIG. 2 is a representational graph showing the order of recording of information from the reflectors.
Figure 5:
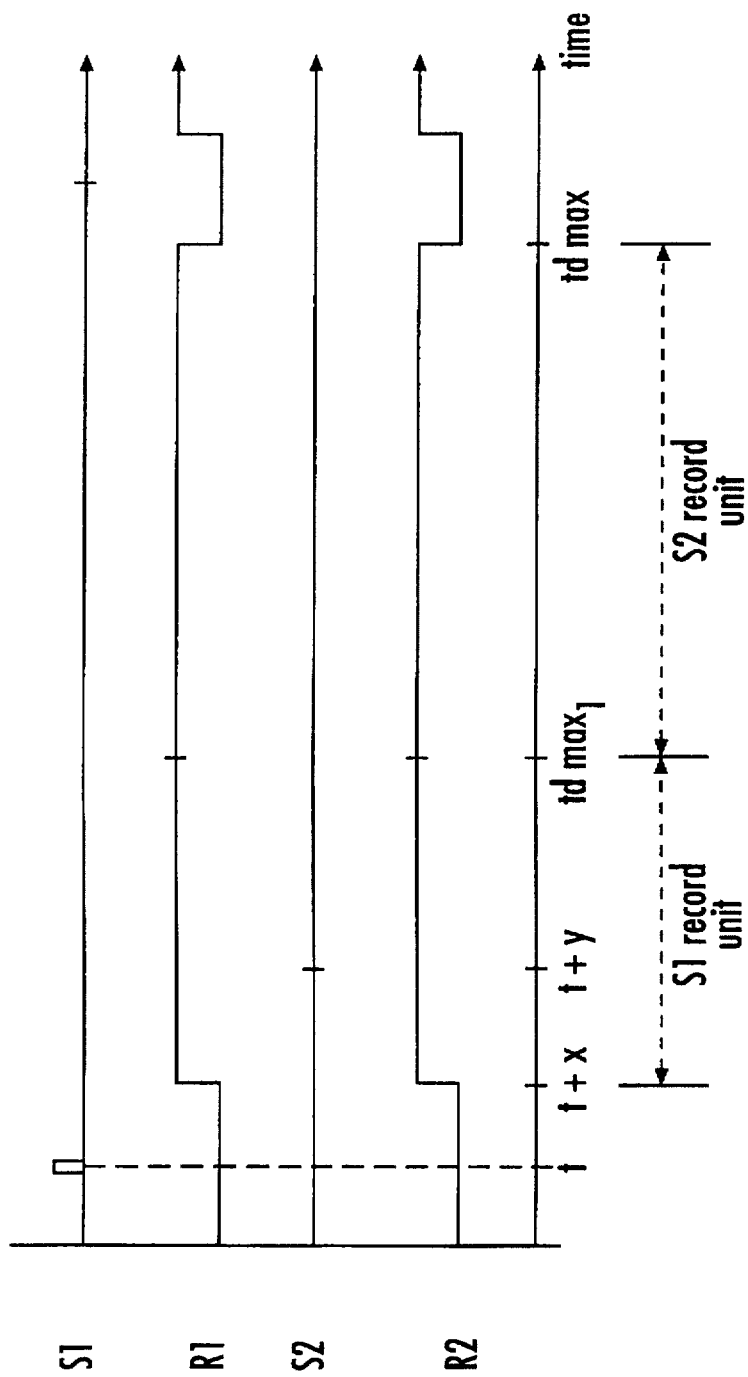
FIG. 5 is a timing diagram of a method of firing sources according to an embodiment of the invention.

Referring now to FIGS. 1, 2, and 5, the timing of a method useful with the embodiment of FIG. 3 will be described. FIG. 1 shows an idealized plot of sources S1 and S2 and receivers R1 and R2, and the rays from sources S1 and S2 to reflectors a1–3, b1–3, and c1–3, below the earth's surface 50. For simplicity, not all rays are traced in FIG. 1. FIG. 5 shows a timing diagram of the firing of the sources S1 and S2 and the information recorded at hydrophones R1 and R2, and FIG. 2 shows the recordings made from hydrophones R1 and R2, with identification of the reflectors represented in the recording.

Referring now to FIG. 5, according to this aspect of the invention, the method comprises: firing source S1 at a first instant t, whereby a first source firing event is defined; recording at an instant t+x, through the receivers 14 in the streamers 10, into a first record (R1 of FIG. 2), information from reflectors a2, b2, c2 to the first source firing event for a time equal to the travel time from source S1 to a maximum depth of interest. Likewise, information from the reaction of reflectors a1, b1, and c1 is recorded into the first record through receiver R2. This time is represented as time tdmax1 in FIG. 5.

Next, the method further comprises firing the other of the source S2 at a second instant t+y (FIG. 5), whereby a second source firing event is defined and wherein the second source firing event occurs before the end of the recording of the information of the first source firing event. The result is the recording of information from reflectors a3, b3, and c3 (into receiver R1) a2, b2, and c2 (into receiver R2), for a time tdmax equal to the travel time from the source S2 to the maximum depth of interest and to the furthest receiver, R2. Referring now to FIG. 2, a record of information signals into the first receiver R1 is recorded for both the first source S1 and the second source S2, resulting in the record R1 of FIG. 2, in which reflectors a2, b2, and c2 are recorded as a result of source S1, and reflectors a3, b3, and c3 are recorded as a result of source S2. Furthermore, referring to FIG. 2, a record of information signals into the second receiver R2 is recorded for both the first source S1 and the second source S2, resulting in the record R2 of FIG. 2, in which reflectors a1, b1, and c1 are recorded as a result of source S1 and reflectors a2, b2, and c2 are recorded as a result of source S2.

Recording the information resulting from the firing of the second source into the same record as the record resulting from firing the first source provides efficiencies of timing and computational power. However, in alternative embodiments, the information of the second source is recorded on a separate record.

Figure 6B:
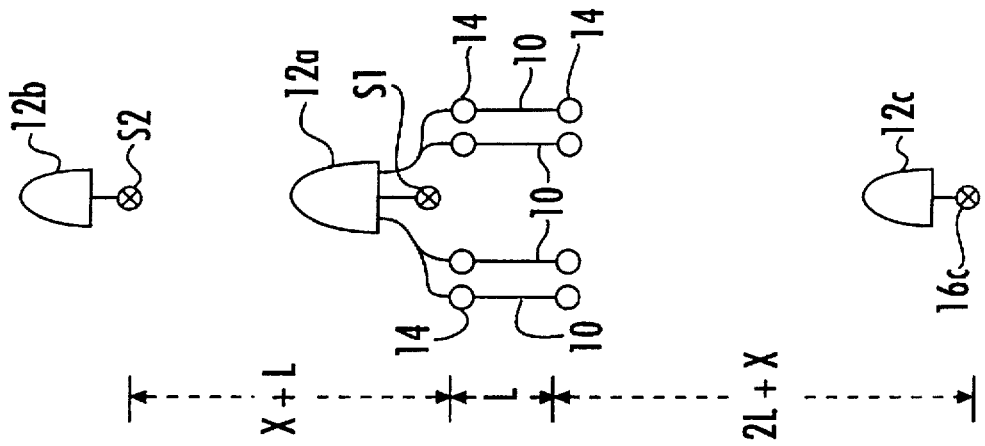
FIGS. 6A, 6B, and 6C are top views of alternative embodiments of the invention
Figure 6C:
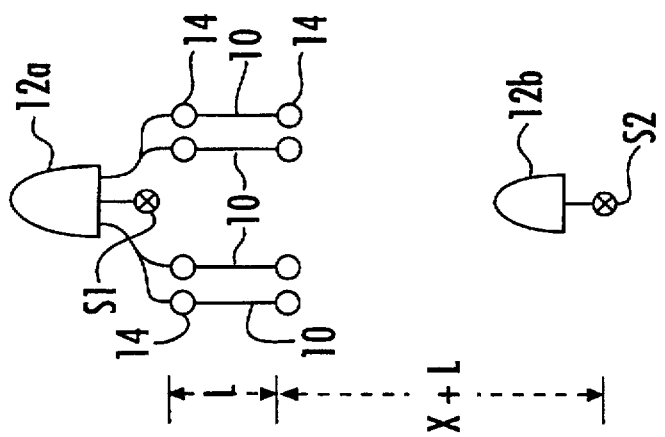
Figure 6A:
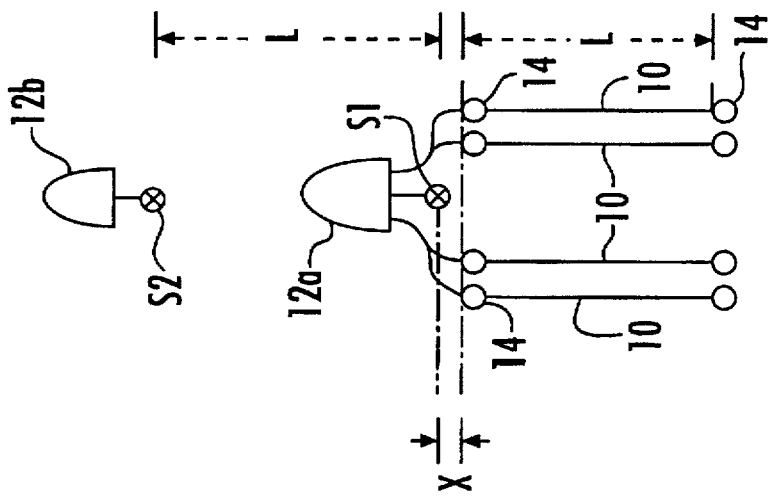

In the case that the results of different sources are recorded into the same record, the data need to be separated into information gathered from each source and processed according to traditional methods, for example as CMP gathers. Those of skill in the art will recognize that as the survey continues, there will be many sets of data from all reflectors to be gathered, some recorded from hydrophones between R1 and R2, and the invention is not limited to the example shown Referring now to FIGS. 6A–6C, various alternative embodiments are shown. As seen in FIG. 6A, the simple tow boat embodiment is shown wherein the length of the streamers is L, and the separation between source S1 of vessel 12a and the head of the middle streamer is X, source S2 is positioned L in front of source S1, or, as seen in FIG. 6C, L+X behind the last active streamer. Referring now to FIG. 6B, according to an alternative embodiment, a third source 16c is towed behind a third source vessel 12c, also along the streamer path, wherein the distance between the third source 16c and the far offset receiver is about 2L+X. The third source 16c is fired at a third instant, whereby a third source firing event is defined, and the information from the third source firing event is recorded, through the receivers 14 in the streamers 10, preferably into the same record as the information from the firing of sources S1 and S2 for a time equal to the travel time from the third source to the maximum depth of interest and to the far offset receiver.

The above-described embodiments are given by way of example only. Other embodiments will occur to those of skill in the art which will not depart from the spirit of the invention.

What is claimed is:

1. A method for recording marine seismic data in a data survey, the survey having a survey line, the method comprising:

towing a plurality of streamers behind a first vessel,
wherein the streamers comprise a set of seismic signal receivers positioned along the streamer for receiving seismic signals and transmitting the signals to the first vessel, and
wherein the outermost streamers define a streamer path substantially parallel to the survey line;

towing a first seismic signal source behind the first vessel,
wherein the receiver closest to the first seismic source defines a near offset receiver,
wherein the distance between the near offset receiver and the first seismic source defines the near offset,
wherein the receiver furthest from the first seismic source defines a far offset receiver,
and wherein the distance between the far offset receiver and the first seismic source defines the first vessel far offset;

towing a second seismic signal source behind a second vessel wherein the source behind the second vessel is towed along the streamer path, wherein the distance between the second source and the closest receiver is about L or less;

firing the one of the sources at a first instant, whereby a first source firing event is defined;

receiving, through the receivers in the streamers, information of the first source firing event, for a time equal to the travel time from the one of the sources to a maximum depth of interest to the far offset receiver;

firing the other of the sources at a second instant, whereby a second source firing event is defined;

receiving, through the same receivers in the streamers, information of the second source firing event for a time equal to the travel time from the other of the sources to the maximum depth of interest to the far offset receiver; and wherein the second source firing event occurs before the end of the recording of the information of the first source firing event.

2. A method as in claim 1 wherein the received information of the second source firing event is recorded into the same record as the received information of the first source firing event.

3. A method as in claim 1 wherein the received information of the second source firing event is recorded into a different record from the record of the first source firing event.

4. A method as in claim 1 further comprising:

towing a third source behind a third vessel wherein the source behind the third vessel is towed along the streamer path, wherein the distance between the third source and the nearest streamer is about 2L, or less;

firing the third source at a third instant, whereby a third source firing event is defined, recording, through the receivers in the streamers into a third record, information of the third source firing event for a time equal to the travel time from the third source to the maximum depth of interest and to the far offset receiver;

wherein the third source firing event occurs before the end of the recording of the information of the second source firing event.

5. A method as in claim 4 wherein the third record is appended to the second record.

6. A method as in claim 1 further comprising:

towing a second streamer vessel substantially parallel to the first streamer vessel wherein the distance between the two closest streamers of the first and the second streamer vessels is about equal to the distance between the streamers of the first streamer vessel; and towing a third streamer vessel substantially parallel to the first streamer vessel wherein the distance between the two closest streamers of the first and the third streamer vessels is about equal to the distance between the streamers of the first streamer vessel;

recording information from the first and second firing events on the second streamer vessel; and recording information from the first and second firing events on the third streamer vessel.

7. A method as in claim 1 wherein the second source is fired with an amplitude greater than the firing of the first source.

8. A method as in claim 7 wherein the second source is fired with at least about twice the amplitude of the first source.

9. A method as in claim 1 wherein:

said first source comprises a first source array having a first source element and a second source element spaced apart on a line substantially normal to the line of the survey;

said second source comprises a second source array having a third source element and a fourth source element spaced apart on a line substantially normal to the line of the survey at about the same distance as the spacing between the first and the second source elements;

the first source element is fired at the first instant in time and the third source element is fired before the end of recording of information of the first source element firing;

after the recording of information of the third source element firing, the second source element fires; and the fourth source element fires before the end of recording of the information from the second source element firing.

10. A method as in claim 9 wherein the second source is fired with an amplitude greater than the firing of the first source.

11. A method as in claim 10 wherein the second source is fired with at least about twice the amplitude of the first source.

12. A method as in claim 1 further comprising:

towing a third source behind a third source vessel wherein the third source behind the third vessel is towed along the streamer path, wherein the distance between the third source and the closest receiver is about twice the first vessel far offset, plus the near offset, or less.

13. A method for recording marine seismic data in a data survey, the survey having a survey line, the method comprising:

towing a plurality of streamers behind a first vessel, wherein the streamers comprise a set of seismic signal receivers positioned along the streamer for receiving seismic signals and transmitting the signals to the first vessel, and wherein the outermost streamers define a streamer path substantially parallel to the survey line;

towing a first seismic signal source behind the first vessel, wherein the receiver closest to the first seismic source defines a near offset receiver, wherein the distance between the near offset receiver and the first seismic source defines the near offset, wherein the receiver furthest from the first seismic source defines a far offset receiver, and wherein the distance between the far offset receiver and the first seismic source defines the first vessel far offset;

towing a second seismic signal source behind a second vessel wherein the source behind the second vessel is towed along the streamer path, wherein the distance between the second source and the closest receiver is about the first vessel far offset, or less;

firing the one of the sources at a first instant, whereby a first source firing event is defined;

receiving, through the receivers in the streamers, information of the first source firing event for a time equal to the travel time from the one of the sources to a maximum depth of interest to the far offset receiver;

firing the other of the sources at a second instant, whereby a second source firing event is defined;

receiving, through the same receivers in the streamers, information of the second source firing event for a time equal to the travel time from the other of the sources to the maximum depth of interest to the far offset receiver; and wherein the second source firing event occurs before the end of the recording of the information of the first source firing event.

14. A method as in claim 13 wherein the received information of the second source firing event is recorded into the same record as the received information of the first source firing event.

15. A method as in claim 13 wherein the received information of the second source firing event is recorded into a different record from the record of the first source firing event.

16. A method as in claim 13 further comprising:

towing a second streamer vessel substantially parallel to the first streamer vessel wherein the distance between the two closest streamers of the first and the second streamer vessels is about equal to the distance between the streamers of the first streamer vessel; and towing a third streamer vessel substantially parallel to the first streamer vessel wherein the distance between the two closest streamers of the first and the third streamer vessels is about equal to the distance between the streamers of the first streamer vessel.

recording information from the first and second firing events on the second streamer vessel; and recording information from the first and second firing events on the third streamer vessel.

17. A method as in claim 13 wherein the second source is fired with an amplitude greater than the firing of the first source.

18. A method as in claim 17 wherein the second source is fired with at least about twice the amplitude of the first source.

19. A method as in claim 17 wherein:

said first source comprises a first source array having a first source element and a second source element spaced apart on a line substantially normal to the line of the survey;

said second source comprises a second source array having a third source element and a fourth source element spaced apart on a line substantially normal to the line of the survey at about the same distance as the spacing between the first and the second source elements;

the first source element is fired at the first instant in time and the third source element is fired before the end of recording of information of the first source element firing;

after the recording of information of the third source element firing, the second source element fires; and the fourth source element fires before the end of recording of the information from the second source element firing.

20. A method as in claim 19 wherein the second source is fired with an amplitude greater than the firing of the first source.

21. A method as in claim 20 wherein the second source is fired with at least about twice the amplitude of the first source.

* * * * *

UNITED STATES PATENT AND TRADEMARK OFFICE
CERTIFICATE OF CORRECTION

PATENT NO : 5,761,152
DATED : June 2, 1998
INVENTOR(S): Nils-Erik Jacobsen, Svein Torlief Vaage and Rolf Ronningen It is certified that error appears in the above-identified patent and that said Letters Patent is hereby corrected as shown below:

In Column 2, Line 45, expression "X+(J+L)" should read --X+(JL+L)--.

Signed and Sealed this

Twenty-first Day of September, 1999

Q. TODD DICKINSON

*Attest:*

*Attesting Officer*  *Acting Commissioner of Patents and Trademarks*